A. B. THOMAN & P. H. SLAMIN.
TIRE.
APPLICATION FILED FEB. 8, 1910.
985,302.
Patented Feb. 28, 1911.
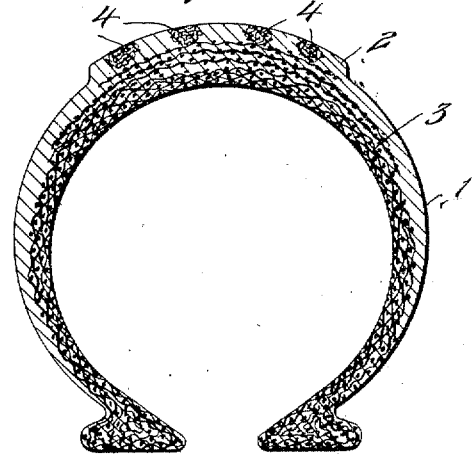
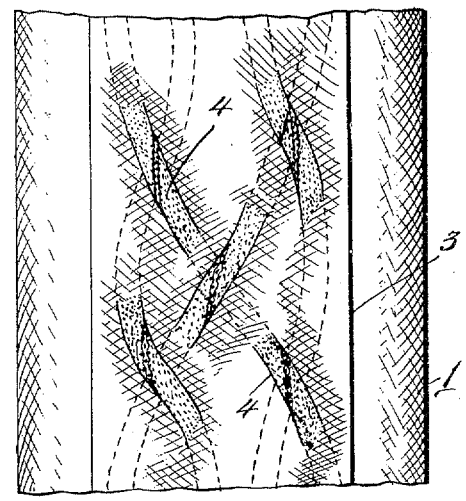
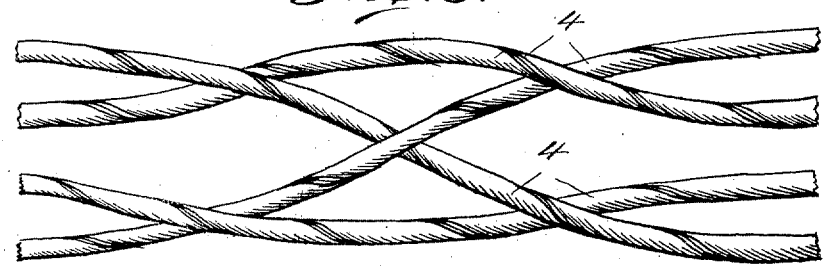
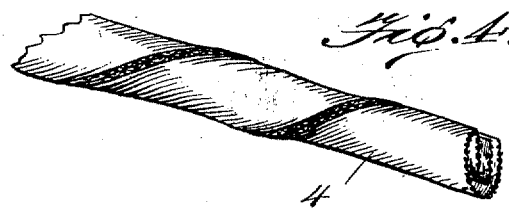
Witnesses
Inventors
Anthony B. Thoman
Patrick H. Slamin
W. P. McElroy Attorney

UNITED STATES PATENT OFFICE.

ANTHONY B. THOMAN AND PATRICK H. SLAMIN, OF TRENTON, NEW JERSEY, ASSIGNORS TO THE EMPIRE TIRE COMPANY, OF TRENTON, NEW JERSEY, A CORPORATION OF NEW JERSEY.

TIRE.

985,302.  Specification of Letters Patent.  Patented Feb. 28, 1911.

Application filed February 8, 1910. Serial No. 542,815.

*To all whom it may concern:*

Be it known that we, ANTHONY B. THOMAN and PATRICK H. SLAMIN, citizens of the United States, residing at Trenton, in the county of Mercer and State of New Jersey, have invented certain new and useful Improvements in Tires, of which the following is a specification.

This invention relates to tires; and it comprises a tire having a rubber tread portion provided with spaced and isolated inset frictional bodies, occupying but a portion of the area of the face of said tread and substantially level with its surface, said frictional bodies or insets comprising a plurality of twisted layers or strips of rubber-impregnated cloth or fabric laid in the tire in the direction of their length and spaced apart by comparatively large areas of rubber tread face, such strips of fabric being so twisted as to give edgewise frictional faces in the face of the tire tread, and the rubber of the inset bodies and the tread being vulcanized into an integral mass; all as more fully hereinafter set forth and as claimed.

The desirability of providing tires of the pneumatic or cushion type with a rubber tread face is of course well recognized since the yielding qualities of rubber make it easier and smoother riding than a tire with a face of any other material. But rubber in use is subject to abrasive wear and while its frictional qualities under most circumstances are very great, yet since water does not readily wet rubber or actually contact therewith, in use of a rubber tread upon wet, smooth pavements or in contact with wet materials the tire is apt to slip or skid. Many efforts have been made to obviate these disadvantages of rubber in the tread while retaining its advantages, but they have not been as successful as may be desired. If the face of the tread be made of other material than rubber the advantages of the rubber tread are of course lost. If for instance the tread be faced with a layer of cloth or fabric, as by looping a band or layer of canvas around it, the frictional qualities secured are not much better since the friction in use is in line with the length of the cloth or fabric, while such cloth or fabric is apt to rip or ravel out. Furthermore, while rubber *per se* readily undergoes a concave bend, yet in the presence of a bridging layer of unstretchable cloth, this bending is not ready. It has also been proposed to provide inset metal elements, but these have not been very successful. It is difficult to vulcanize rubber to metal so as to secure a firm and permanent union while a metal body, being stiff and unyielding, exercises a punching action at its base upon underlying layers of the tire. And in use, since the metal will not yield while the rubber does yield, such a metal plug forms a high shoulder with the rubber at its sides under a condition of strain, causing it to break away readily. Metal also tends to wear smooth in use, losing its frictional qualities, while its friction with wet materials is not much better than that of rubber. Wood hard rubber and other materials are, like the metal, comparatively rigid and unyielding and while their frictional qualities in wet situations are better than those of the metal yet they suffer from other disadvantages. Practically it may be said to be irrational to inset in the face of a tire which is meant to be yielding and elastic something which is unyielding and not elastic.

In the present invention a new type of tread face is attained combining the advantages of a rubber tread with advantages of a tread having material with a better coefficient of friction for wet and slippery surfaces. To this end, the tire is provided with a plurality of inset strips of rubber-impregnated fabric placed longitudinally around the tire, but preferably not extending in straight lines. These strips are placed in the tire in such a position that their outer face is flush with the rubber of the tread and are twisted prior to placing in position to give a cross-grain friction. By reason of this twisting, there are no threads or fibers lying with their length in the tread of the tire and there is therefore no danger of ripping or raveling while at the same time a much better effect is secured. A strip of cloth or fabric, such as canvas or other suitable material, may be "frictioned" or coated with rubber on one or both sides, but preferably on both and then twisted to give it the appearance of a round cord. Prior to twisting it may be folded in one or more plies. Several of these cords may be twisted together in a loose network. In making the tread a plurality of these cord-like twisted layers of rubber coated fabric are laid in position and the rubber to form the tread molded around them and the whole vulcanized, thereby converting the rubber into an integral mass throughout. In the vulcanization, the plastic rubber of the inset portions and that of the tread proper unite to form an integral mass. After vulcanizing the face of the tread presents a plurality of spaced and isolated frictional areas composed of the edge of the twisted strips. These strips are preferably separated by relatively greater areas of rubber. In use, the frictional areas though flexible and yielding being somewhat less so than the rubber proper yield less and form a low shoulder to take advantage of irregularities in the roadway while at the same time the shoulder is not high enough to produce undue strains in the surrounding rubber. And the cohesion between the rubber of the body of the tread and the rubber of the fabric layers is of course perfect. And these friction producing insets not being rigid, there can be no punching action upon underlying members of the tire. The body of the tire carrying the improved tread may be of any of the usual cushion or pneumatic tires, as for instance the ordinary clencher tire carrying an inner tube and having a shoe or tread of rubber.

In the accompanying illustration are shown, more or less diagrammatically, certain embodiments of the described invention.

In this showing:—Figure 1 is a vertical section of an ordinary clencher tire or tire shoe; Fig. 2 is a plan view of the same; Fig. 3 shows several cord-like bodies of rubber-impregnated fabric ready for positioning in a tire tread; and Fig. 4 shows one such cord-like body on an enlarged scale showing the twisting.

Numeral 1 designates a tire as a whole, this tire being provided with a tread 2 and strengthening body 3. Inset in the face of the tread are a plurality of the described friction devices 4. As shown in Fig. 2, these are advantageously disposed out of line with the line of the tread, both vertically and horizontally. This may be done in the manner shown in Fig. 3 which represents several such bodies meshed. Placing these meshed bodies in the tire mold, and then building up with rubber in the usual manner, these cord-like members may alternately come to the surface in a convex bend and disappear therebeneath in a concave bend, giving spot-like frictional areas, or they may be flush with the surface at all points and be merely out of line horizontally. Either disposition gives a very good tread surface since it renders a maximum the engagement of the tread with minor irregularities in the roadway. In making the cord-like member, a strip or layer of cloth or fabric, such as canvas or duck, may be faced on one or both sides with rubber or rubber composition and then twisted into cord-like shape. Or the strip may be folded one or more times on itself prior to twisting. By this twisting, edges of the fabric are exposed and are brought into the tread surface, giving an edge-on or end-on frictional engagement with the roadway, an engagement which is much more desirable than a face-on engagement of a fabric layer aside from the fact that the latter facilitates raveling and loosening of threads. In the tire of the present invention, the body of each thread is buried in the tread surface and cannot ravel out or become loose. The cross-edge friction of these strips supplements the frictional properties of the rubber areas of the tread face in a very desirable way since fibers do not slip on wet surfaces as does rubber. In the complete tire, areas of exposed fabric edge alternate with areas of rubber. And the inset frictional bodies being merely somewhat less elastic than the rubber of the tread yield with it under pressure so that the easy riding qualities of the tire are not impaired but they do not deform quite so much, presenting merely a low shoulder to take advantage of minor irregularities in the roadway. The shoulder is not high enough to produce strains in the rubber next thereagainst, nor is the frictional member rigid and stiff enough either to produce punching strains in underlying layers or leverage on the rest of the tread.

Some of the advantages of the present invention may be attained by disposing the cord-like strips in other than crossing relation; but this relation is desirable as it forms boxed-off areas of rubber in the face of the tread which under pressure form similar low depressions, advantageous in catching and holding irregularities as well as exhibiting in some degree a suction action on wet surfaces.

The tread proper may be formed of rubber or any of the ordinary rubber compositions; and similarly any of the ordinary rubber compositions may be used for impregnating or coating the friction bodies.

The cord-like bodies may be thick enough to extend downwardly through the entire thickness of the tread or may have a downward extension somewhat short of this.

What we claim is:—

1. A vehicle tire having a rubber tread face provided with a plurality of inset wear pieces isolated by larger areas of rubber, such wear pieces each comprising a layer of rubber treated fabric inset in the tread in such manner as to bring a side edge in the line of the tread face and such layer being twisted into cord-like form, the rubber of the inset wear pieces and that of the tread forming an integral mass.

2. A vehicle tire having a rubber tread face provided with a plurality of inset wear pieces isolated by areas of rubber, such wear pieces each comprising a twisted layer of rubber treated fabric inset in the tread in such a manner as to bring an edge in the tread face, and each such layer being set crossing the circumferential lines of the tire, the rubber of the inset wear pieces and that of the tread forming an integral mass.

3. A vehicle tire having a rubber tread face provided with a plurality of inset wear pieces isolated by areas of rubber, such wear pieces each comprising a twisted cord-like layer of rubber treated fabric inset in the tread in such a manner as to bring an edge in the tread face and such wear pieces being so arranged as to cross each other in an open mesh, the rubber of the inset wear pieces and that of the tread forming an integral mass.

4. A vehicle tire comprising a tread face presenting alternating areas of rubber and line-like areas of rubber impregnated fabric, such fabric being inset in the body of the tread in such manner as to bring the edges of the fabric layers in the face of the tread, each such layer being twisted into cord-like form and crossing and recrossing the circumferential lines of the tire.

5. A vehicle tire comprising a tread face presenting alternating areas of rubber and discontinuous curvilinearly-bounded areas of rubber-impregnated fabric, such fabric being inset in the body of the tread in such manner as to bring the edges of the fabric layers in the face of the tread, each such layer being twisted into cord-like form and crossing and recrossing the circumferential lines of the tire.

In testimony whereof, we affix our signatures in the presence of witnesses.

ANTHONY B. THOMAN.
PATRICK H. SLAMIN.

Witnesses as to signature of Anthony B. Thoman:
A. BOND CARNES,
CHAS. H. SEMPLE.

Witnesses as to the signature of Patrick H. Slamin:
A. BOND CARNES,
W. T. BONNER.